United States Patent [19]

Li et al.

[11] Patent Number: 5,355,366
[45] Date of Patent: Oct. 11, 1994

[54] TRAFFIC INTERMIXING MECHANISM FOR FAST CIRCUIT SWITCHING

[75] Inventors: Chung-Sheng Li, Ossining; Christos J. Georgiou, White Plains, both of N.Y.

[73] Assignee: International Business Machines Corporation, Armonk, N.Y.

[21] Appl. No.: 51,968

[22] Filed: Apr. 23, 1993

[51] Int. Cl.⁵ .............................................. H04J 3/16
[52] U.S. Cl. .................................. 370/94.2; 370/111
[58] Field of Search .............. 370/60.1, 60, 111, 94.2, 370/94.1, 112, 102, 80, 81, 95.1–95.3, 79, 110.1, 100.1, 105.1; 375/112, 106

[56] References Cited

U.S. PATENT DOCUMENTS

| | | | |
|---|---|---|---|
| 3,922,497 | 11/1975 | Artom et al. | 370/111 |
| 3,995,120 | 11/1976 | Pachynski, Jr. | 370/111 |
| 5,121,385 | 6/1992 | Tominaga et al. | 370/112 |
| 5,136,586 | 8/1992 | Greenblatt | 370/111 |

Primary Examiner—Wellington Chin
Assistant Examiner—Ajit Patel
Attorney, Agent, or Firm—Douglas W. Cameron

[57] ABSTRACT

A method and apparatus for intermixing circuit and packet data on a shared transmission medium. With this invention, the history of gaps between transmitted circuit frames is used to predict future gap sizes. If the size of a predicted gap is larger than the size of a frame of packet data to be transmitted, then the packet data is inserted in the next gap. If a circuit data frame arrives before the completion of transmission of a packet frame, the circuit data will be stored in an insertion buffer until completion of transmission of the packet frame.

8 Claims, 5 Drawing Sheets

TRAFFIC INTERMIXING MECHANISM FOR FAST CIRCUIT SWITCHING

TECHNICAL FIELD

This invention generally relates to the intermixing of circuit and packet switching data in a fast circuit switching environment. More specifically, the history of gaps between transmitted circuit frames is used to predict the size of the next gap that will exist between transmitted circuit frames. If the size of the predicted gap is larger than the size of a frame of packet data to be transmitted, then the frame of packet data is inserted in the next gap. If the gap is smaller than anticipated, the next arriving circuit frame will be stored in a buffer until completion of the transmitted packet frame.

DESCRIPTION OF THE PRIOR ART

In a fast circuit switching environment, a circuit path (or connection) is established between the input port and the output port of a switch fabric for both packet-switched and circuit-switched traffic. A circuit in the switch fabric is disconnected right after a frame is transmitted for packet-switched traffic. On the other hand, the established circuit remains intact for the duration of a circuit connection for circuit-switched traffic. In certain applications such as multimedia or file transfers, video or image frames require large blocks of data to be partitioned into smaller packets ($\leq$2K bytes) before they are transmitted through the network. Assuming the data is compressed and carried by a gigabit data link, long pauses can usually be found in between the transmitted frames. Therefore, it is desirable that a circuit for a circuit-switched data stream can be disconnected momentarily during unused interval so that packet-switched traffic destined for the same output port can be intermixed. This intermixing is important in order to allow a port to receive both circuit-switched and packet-switched traffic simultaneously while minimizing the possible delay or jitter for circuit-switched traffic. On the other hand, it is desirable to reduce the overhead associated with breaking an old connection and establishing a new connection each time a frame in a packet-switched data stream needs to be transmitted, as compared to a pure circuit-switched environment.

R. Grunenfelder, J. P. Cosmas, S. Manthrope, and A. Odinma-Okafor, "Characterization of Video Codecs as Autoregressive Moving Average Processes and Related Queueing System Performance", IEEE Journal on Selected Areas in Communications, Vol. 9, No. 3, April 1991, shows that there exist good models for the output traffic from a video codec. Therefore, the principle prediction mechanism suggested by this article could be readily applicable to a circuit which carries this type of traffic.

SUMMARY OF THE INVENTION

It is an object of this invention to provide for efficient intermixing of circuit-switched and packet-switched frames on a shared transmission medium.

It is a more specific object of this invention to provide for the intermixing of packet-switched and circuit-switched frames with minimum jitter and delay in the circuit switching characteristics.

This invention provides a mechanism that predicts the gap that will exist between circuit-switched frames, and this predicted gap will be used to determine whether a frame of packet data is to be inserted between a gap in circuit-switched frames.

The insertion buffer guarantees a lossless intermix operation even in the event of a gap prediction error. Further, this invention compensates for jitter caused by an underpredicted gap by deferring the transmission of a circuit-switched frame until after completion of the transmission of an inserted packet-switched frame.

Accordingly, the present invention relates to an apparatus and method for transmitting packet data in between transmission of circuit data frames. With this invention gaps between transmitted circuit data frames are monitored, and the lengths of these gaps are measured. The length of subsequent gaps are then predicted using the measured length of previous gaps. A packet frame will be transmitted when the predicted gap is larger than the size of the packet to be transmitted.

More specifically, in a further refinement of this invention, if an inserted frame of packet data has not completed transmission upon arrival of circuit data the circuit data will be stored in an insertion buffer and transmitted after completion of the inserted packet data frame.

DESCRIPTION OF THE PREFERRED EMBODIMENT

Figure 1:
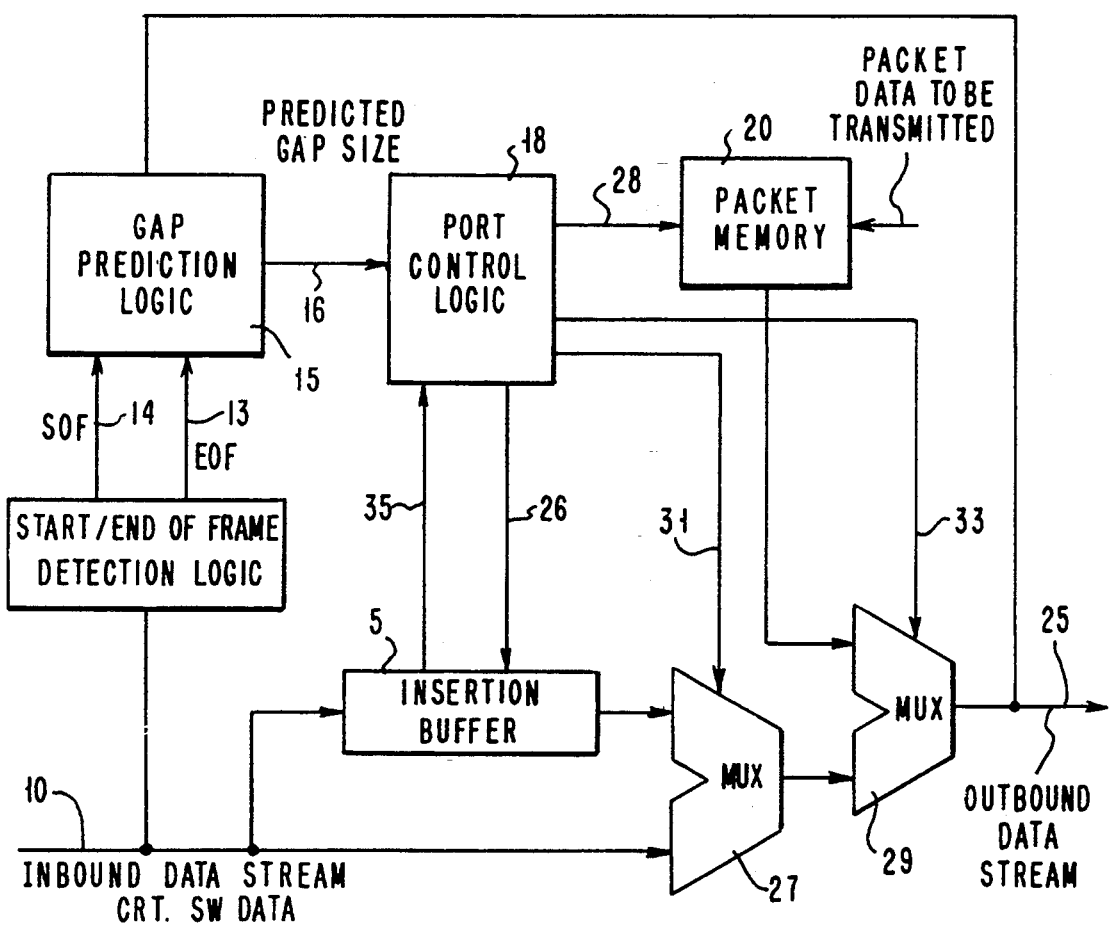
FIG. 1 schematically illustrates the intermixing mechanism used in this invention.
Figure 2:
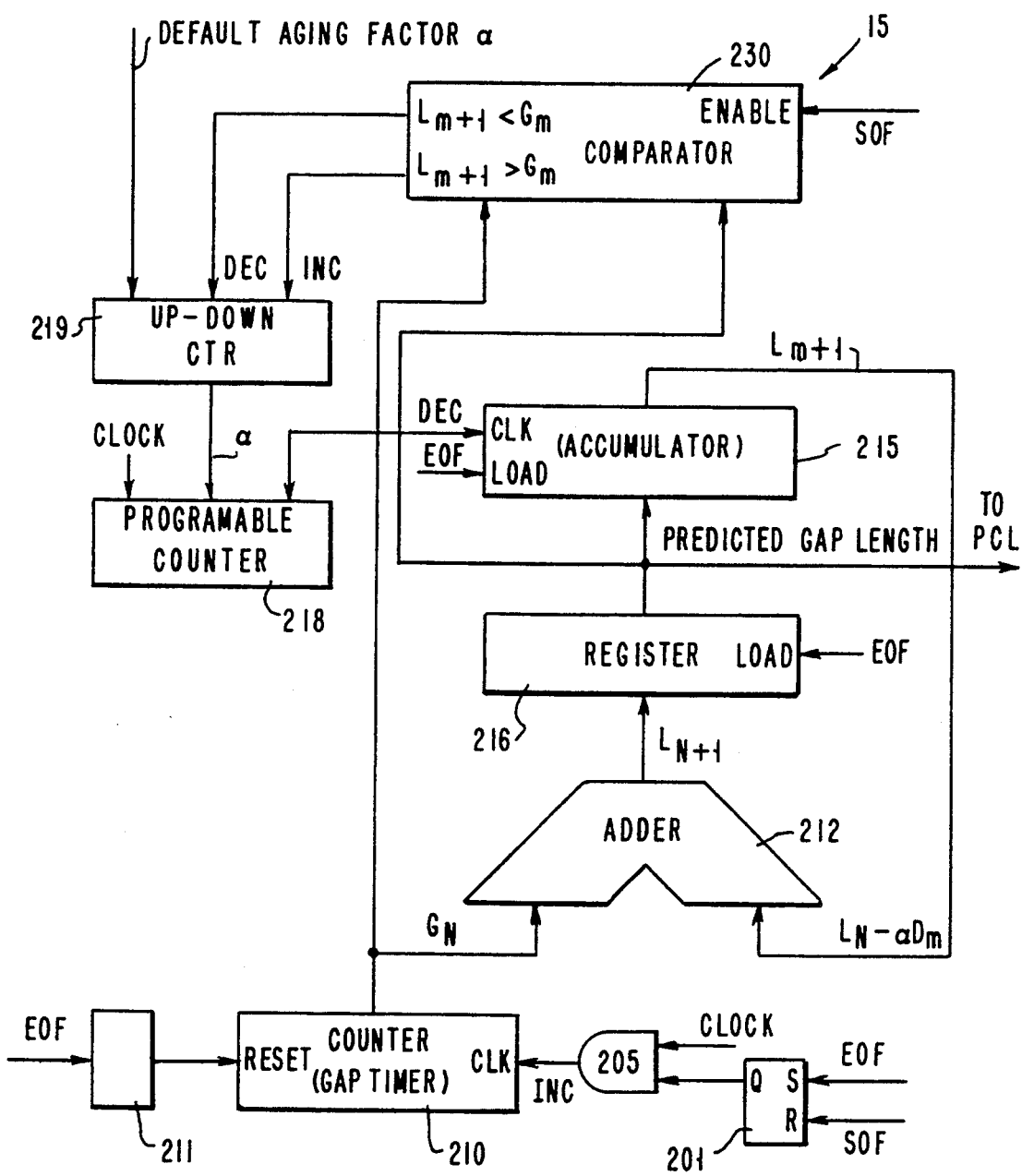
FIG. 2 is a schematic illustration of the gap prediction logic circuit.

Referring now to the drawings, and more particularly, to FIG. 1, there is shown a schematic illustration of the overall apparatus of the present invention. Shown is inbound data stream 10 which is monitored by the start/end-of-frame detection logic circuit 12, which is used to recognize start-of-frame and end-of-frame delimiters for the circuit-switched frames. The detection logic circuit 12, upon recognition of a start of frame or end of frame delimiter, sends an EOF (end of frame) 13 or an SOF (start of frame) 14 signal to the gap prediction logic circuit 15. The gap prediction logic circuit, which is illustrated in detail in FIG. 2, is used to measure gaps in the transmission of circuit switched data frames, as well as to predict a future gap size between these circuit-switched data frames. The predicted gap size is sent over line 16 from the gap prediction logic circuit to the port control logic circuit 18, which is used to determine whether packet data is to be inserted between circuit-switched frames from the inbound data stream 10. If the predicted gap size is greater than the size of the packet data frame to be transmitted, the packet data will be inserted between frames of circuit-switched data. If a circuit-switched frame arrives before the completion of the transmitted frame of packet data, the circuit-switched frame will be stored in the insertion buffer 5 until completion of the packet data frame. The port control logic circuit 18 will intermix circuit-switched frames and packet data frames by controlling multiplexers 27 and 29 through select lines 31 and 33.

The port control logic circuit also has lines 28 for read/write enable and addressing packet memory 20. Lines 26 is used for an I/O enable for the insertion buffer 5.

The gap prediction logic circuit 15 is shown in greater detail in FIG. 2. Referring to FIGS. 1 and 2, upon detection of an end-of-frame delimiter (EOF) in the inbound data stream 10 by the detection logic circuit 12, the detection logic circuit will send an EOF signal to the set terminal of flip-flop 201 whose output is ANDed with clock signal 202 through AND gate 205, whose output in turn is used to control counter 210. See FIG. 2. The EOF signal is also used to reset the counter to 0. Upon detection of a start-of-frame delimiter in the inbound data stream, the detection logic circuit 12 sends an SOF signal, which is used to reset flip-flop 201 and thereby disable clock signal 202. When the clock signal no longer appears at the output of AND gate 205, the counter 210 ceases to increase its count. Thus, the counter measures the number of clock cycles ($G_N$) from the end of a previous circuit switched frame to the start of the next circuit switched frame. The gap size $G_N$ is then added, through adder 212 to the current value ($L_n - \alpha D_n$) below in the accumulator 215. The sum ($L_{N+1}$) provided at the output of the adder is then stored in a register 216 upon detection of a subsequent EOF signal from the detection logic circuit 12. The value in register 216 is now the predicted gap length that is forwarded to the port control logic circuit 18. This predicted gap length also becomes the value stored in the accumulator 215. The accumulator 215 also has a programmable counter 218 which causes the value that is stored in the accumulator to decrease at a certain clock rate. The value contained in this programmable counter is incremented by one during each clock cycle, and a decrement signal is sent to accumulator 215 when the value in the programmable counter reaches that in the up-down counter 219. The value $\alpha$ in counter 219 is previously set and is loaded with a default aging factor $\alpha_0$ when a circuit is first set up. This latter value in the counter 219 is also modified as a result of a comparison between $G_N$ and $L_{N+1}$ by comparator circuit 230. If the predicted gap length $L_{N+1}$ is greater than the actual previous gap length $G_N$, then the rate at which the accumulator counts down is increased. Similarly, if the predicted gap length is less than the actual previous gap length, the comparator circuit 230 will cause the counters to decrease the rate at which the accumulator counts down. The comparator 230 is enabled by the SOF which marks the end of the gap. A delay element 211 is used to postpone the reset signal to the counter 210, so that a race condition does not exist when the adder 212 is adding the value in counter 210 with the value in counter 215 and storing the result $L_{N+1}$ in the register 216. In summary, this simple mechanism implements an approximation of an adaptive infinite impulse response filter (IIR) in which the length of the next gap $L_{n+1}$ is predicted from the current gap $G_n$, indicated by the gap timer, and the previous prediction $L_n$, indicated by the accumulator:

$$L_{n+1} = G_n + (L_n - \alpha D_n), \quad (1)$$

where $\alpha$ is an adaptive aging factor which determines the count down rate of the accumulator, while $D_n$ is the length of the current data frame plus the preceding gaps. See below and FIG. 3. The aging factor $\alpha$ is preloaded with the default aging factor before the gap prediction process begins. This default aging factor $\alpha_0$ is precomputed so that the predication error is minimized for an ensemble of traffic patterns. After the aging factor $\alpha$ is loaded, it is dynamically adjusted and can be increased or decreased depending on the sign of the prediction error.

The predicted value of $L_{n+1}$ will be used to determine whether a packet frame can be inserted and intermixed with the circuit-switched traffic. During heavy traffic in a circuit, $L_{n+1}$ remains low, and no packet frames can be allowed to sneak into the circuit. Since there is always a fix overhead associated with setting up a new circuit for transmitting a packet, the predicted gap length must be greater than a threshold before a packet is allowed to be inserted. After inserting a packet frame, the gap between circuit frames is reduced and may become negative in some cases. That is, the next circuit-switched frame arrives before the end of the current packet frame. A negative $L_n$ will prevent the port control logic from inserting more packet frames into the circuit. This mechanism also helps to regulate the intermix traffic and achieve flow control. Furthermore, long burst of frames in a circuit make the insertion of a packet frame less possible because it is more likely that $L_{n+1}$ ages below the threshold by the time the next gap shows up.

Figure 3A:
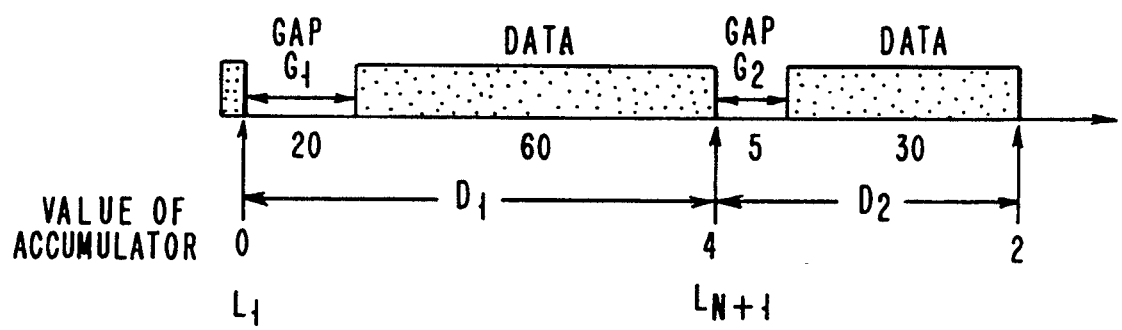
FIGS. 3A and 3B graphically illustrate gaps between transmission of circuit data under heavy and light traffic respectively.
Figure 3B:
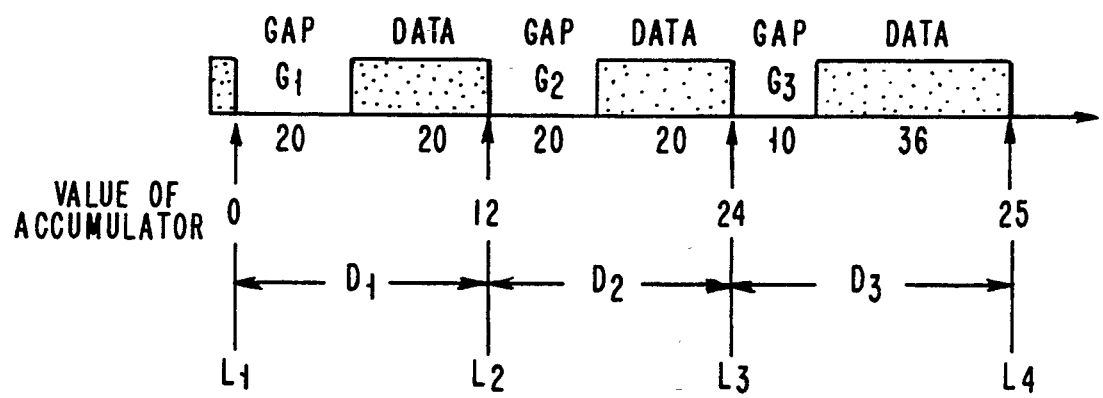

FIG. 3 schematically illustrates the gap prediction mechanism under heavy and light traffic. In FIG. 3(a), the value of the accumulator 215 in FIG. 2 is initiated with zero ($L_1$). The first gap ($G_1$) has a value 20 generated by the counter 210 in FIG. 2, and the data packet has a length 60. By the end of the data packet, the value in the accumulator 215 is $-16$ or ($L_1 - 0.2D_1$), assuming the count down rate is one fifth of the clock rate. So the predicted gap at $L_2$, the second prediction times is 4 or ($G_1 + (L_1 - 0.2D_1)$). The predicted gaps values of 0, 4, 2 are shown in FIG. 3A, while the predicted gap values of 0, 12, 24, and 25 are shown in FIG. 3B. Assuming the sizes of the packets in the packet memory for 3A are 2, 3, and 4, no packets will be inserted during the first gap, since all the packets are larger than the predicted value. The packet with size 4 will be inserted into the second gap, and the packet with size 2 will be inserted into the third gap.

The calculation process of $L_i$ is as follows: $L_1$ is zero. $G_1$ is 20, and $L_2$ is $20 - 0.2 \times (20 + 20) = 12$. $L_3$ is $20 + 12 - 0.2 \times (20 + 20) = 24$. $L_4$ is $10 + 24 - 0.2 \times (10 + 36) = 25$. Note that $0.2*(10+36)$ has been rounded off to 9.

All of the other predicted values shown in FIG. 3(a) and 3(b) are obtained by using the same procedure.

The mechanism described in FIG. 2 can be significantly enhanced by having a second accumulator 443 in addition to the first accumulator 215. See FIG. 4. The aging rate of the accumulator controlled by up-down counter 453 and programmable counter 452. In this case, upon each end-of-frame event, the value of the current gap $G_n$ is added to the previous two predictions, $L_n$ (by adder 212) and $L_{n-1}$ (adder 460) to produce the next prediction (stored in register 442). The predicted gap length thus equals:

$$L_{n+1} = G_n + (L_n - \alpha_1 D_n) + (L_{n-1} - \alpha_2 D_n) \quad (2)$$

Note that the previous predictions are aging at a different rates $\alpha_1$ (determined by counter 219 and programmable counter 218) and $\alpha_2$ (determined by counter 453 and programmable counter 452). The detailed operation of each set of counters is the same as described earlier for counter 218 and programmable counter 219. The predicted value, which is stored in register 443, is compared with the real size of the gap (produced by gap timer 210) by comparator 470 at at each start-of-frame. The result is then used to adjust counters 219 and 453. This adjustment, in principle, can capture higher order behavior of the traffic history and produce a more accurate prediction. Again, as described above, the prediction result is also compared to the gap length at the start of frame event and the prediction error is then used to adjust the aging factors.

Figure 4:
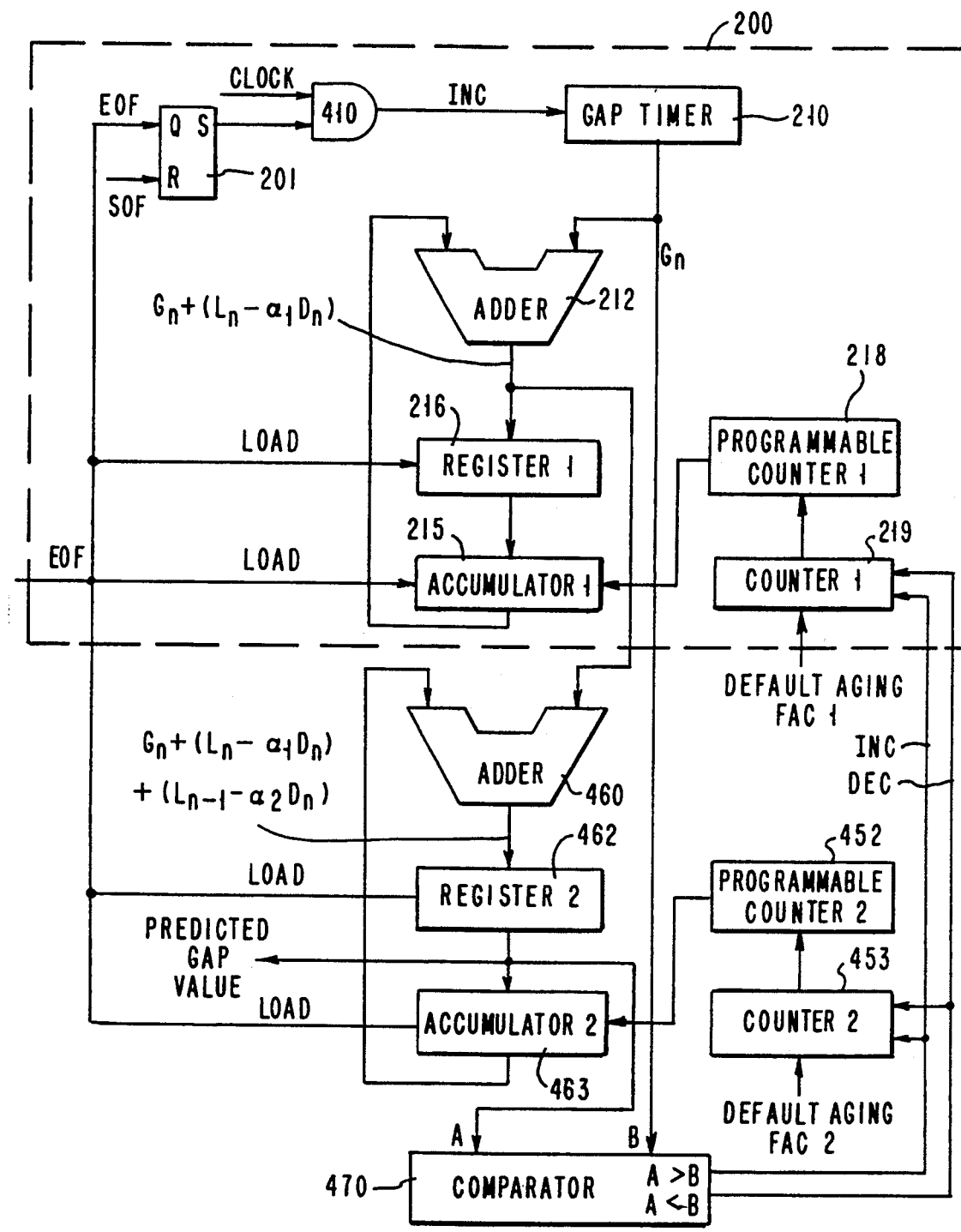
FIG. 4 graphically illustrates an enhanced version of the gap prediction logic circuit in FIG. 2. This enhanced version includes an additional accumulator.

The mechanism of FIG. 2 and FIG. 4 can usually make full utilization of the gap (silence interval) during a circuit-switched data stream. However, it won't be able to utilize the first gap after a long busy period or alternating long bursts and long silence. A combination of the fixed threshold and prediction methodologies can be used to overcome this potential pitfall. The fixed threshold mechanism gap predication mechanism provides a timer which is triggered by the end of each frame when it begins to count the elapsed time for the silent interval. A packet from the buffer memory is selected to be injected into the circuit-switched data stream once a threshold is reached by the timer. In the meantime, the circuit traffic is rerouted to the insertion buffer while a packet is inserted. Though this gap prediction mechanism is sufficient for intermixing packets onto a larger gap, it suffers the drawback that a gap will not be utilized until it is timed out. In the combined mechanism, the first long gap after a long burst will be timed out while each subsequent shorter gap will be predicted by the gap prediction mechanism.

Figure 5:
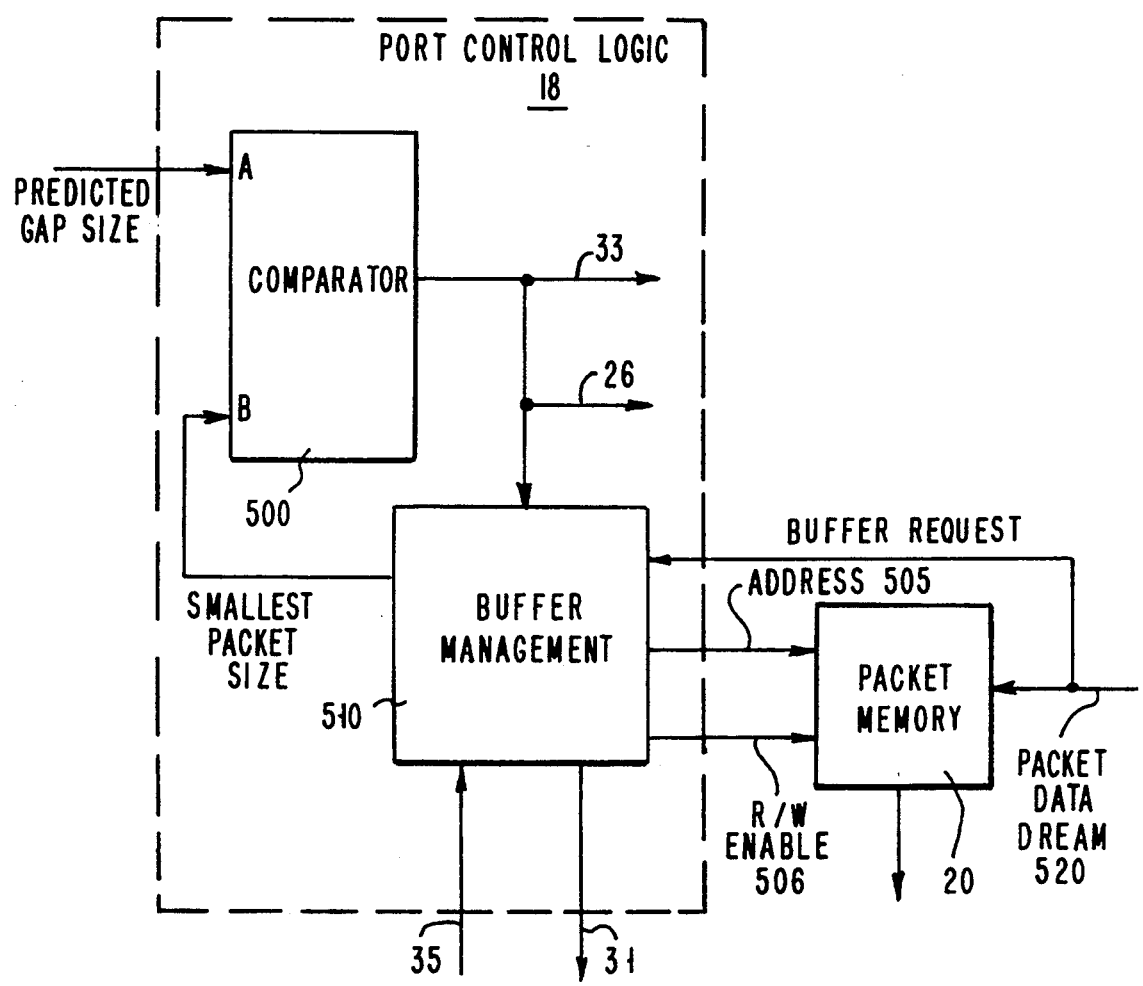
FIG. 5 graphically illustrates the structure of the port control logic circuit.

The port control logic 18 is described in FIG. 5. When there is a data packet coming in at 520, a buffer request signal is sent to the buffer management 510 together with the required buffer size. The buffer management module 510 is supposed to put the packet into the packet memory 20, and register both the location and the size of the packet inside the packet memory. When the predicted gap size from the gap prediction logic 15 is larger than the smallest existing packet in the packet memory, the comparator 500 sends out a signal to line 33 to control the selector 29 (see FIG. 1) so that the data stream from the packet memory can be selected for output. The comparator also sends out a signal to line 26 to enable the insertion buffer so that the incoming circuit data stream 10 is rerouted to the insertion buffer. The same signal is also sent to the buffer management 510 so that a packet with an appropriate size can be selected to be intermixed with the circuit data stream. During each packet intermixing, the circuit data is rerouted to the insertion buffer if the prediction is not accurate so that no data loss occurs. The insertion buffer, however, must be at least as large as the inserted packet. At the end of each packet insertion, the insertion buffer is checked (line 35) to determine whether the insertion buffer is empty. If the insertion buffer is empty, the line input is selected in 27 for output while the insertion buffer is selected for output if the insertion buffer is not empty. When the insertion buffer is non-empty, the packet intermixing operation will be suspended. This scheme ensures lossless intermixing operation by allowing packet intermixing operation only if the available insertion buffer size is larger than the size of the inserted packet. The memory management functions described above are well known in the art as evidenced by: J. L. Peterson and A. Silberschatz, "Operating System Concepts," pp. 143–200, 2nd Edition, Addison-Wesley, 1986.

Having thus described our invention, what we claim as new and desire to secure by Letters Patents is:

1. In a shared transmission medium, a method of transmitting packet data in gaps between the transmissions of circuit data comprising the following steps:
    a. monitoring of each occurrence of said gaps appearing in between the circuit data transmitted on said shared transmission medium, and measuring the length of said gaps;
    b. predicting a length of a next gap following said measured gaps in said circuit data, said predicted gap length of said next gap being a function of lengths of said measured gaps; and
    c. transmitting a next frame of packet data when said predicted length of said next gap is larger than a length of said frame of packet data.

2. A method as recited in claim 1, wherein a length of a first of said gaps is compared with a threshold and a frame is transmitted in said first gap if said length of said first gap exceeds said threshold.

3. A method as recited in claim 1, wherein said function is a linear prediction function.

4. In a shared transmission medium, an apparatus for transmitting packet data in gaps between the transmissions of circuit data said apparatus comprising:
    a. means for monitoring of each occurrence of said gaps appearing in between the circuit data transmitted on said shared transmission medium, and measuring the length of said gaps;
    b. means for predicting a length of a next gap following said measured gaps in said circuit data, said predicted gap length of said next gap being a function of lengths of said measured gaps; and
    c. means for transmitting a next frame of the packet data when said predicted length of said next gap is larger than a length of said next frame of packet data.

5. An apparatus as recited in claim 4, further comprising a means of comparing a length of a first of said gaps with a threshold and a means for transmitting a frame in said first gap if said length of said first gap exceeds said threshold.

6. In a shared transmission medium, a method of transmitting packet data in gaps between the transmissions of circuit data comprising the following steps:
    a. monitoring of each occurrence of said gaps appearing in between the circuit data transmitted on said shared transmission medium, and measuring the length of said gaps;
    b. predicting a length of a next gap following said measured gaps in said circuit data, said predicted gap length of said next gap being a function of lengths of said measured gaps;
    c. transmitting a next frame of packet data when said predicted length of said next gap is larger than a length of said next frame of packet data;
    d. recognizing the arrival of circuit data before the completion of said transmitting of said on next frame of packet data;
    e. storing said arriving circuit data in a buffer;
    f. transmitting said stored circuit data after the completion of said transmitting of said next frame of packet data; and g. repeating the above for subsequent frames of packet data.

7. In a shared transmission medium, an apparatus for transmitting packet data in gaps between the transmissions of circuit data said apparatus comprising:
   a. means for monitoring of each occurrence of said gaps appearing in between the circuit data transmitted on said shared transmission medium, and measuring the length of said gaps;
   b. means for predicting a length of a next gap following said measured gaps in said circuit data, said predicted gap length of said next gap being a function of lengths of said measured gaps;
   c. means for transmitting a next frame of packet data when said predicted length of said next predicted gap is larger than a length of said next frame of packet data;
   d. means for recognizing the arrival of circuit data before the completion of said transmitting of said next frame of packet data;
   e. means for storing said arriving circuit data in a buffer; and
   f. means for transmitting said stored circuit data after the completion of said transmitting of said next frame of packet data.

8. In a shared transmission medium, a method of transmitting packet data in gaps between the transmissions of circuit data comprising the following steps:
   a. monitoring of each occurrence of said gaps appearing in between the circuit data transmitted on said shared transmission medium, and measuring the length of said gaps;
   b. comparing the length of a first of said gaps with a threshold;
   c. transmitting a frame in said first gap if the length of said first gap exceeds said threshold;
   d. predicting a length of a next gap following said measured gaps in said circuit data, said predicted gap length of said next gap being a function of the lengths of said measured gaps;
   e. transmitting a next frame of the packet data when said predicted length of said next gap is larger than a length of said next frame of packet data;
   f. recognizing the arrival of circuit data before the completion of said transmitting of said next frame of packet data;
   g. storing said arriving circuit data in a buffer;
   h. transmitting said stored circuit data after the completion of said transmitting of said next frame of packet data; and
   i. repeating the above for subsequent frames of packet data.

* * * * *